Patented Dec. 22, 1936

2,065,145

UNITED STATES PATENT OFFICE 2,065,145

HYDROLYSIS OF FATS AND GREASES

Jay R. Moore, Oakmont, and Earl K. Wallace, Pittsburgh, Pa.; said Wallace assignor to said Moore No Drawing. Application June 28, 1934, Serial No. 732,914

2 Claims. (Cl. 87—4)

This invention relates to the hydrolysis of fats with the formation of fatty acids and glycerol, and consists in a method of procedure which may be followed with great economy. The method is economical in (1) the matter of time, (2) expenditure of equipment and materials, and (3) quality of the products.

In Letters Patent of the United States No. 1,967,319, granted on our application July 24, 1934, we have described and claimed a process of treatment that includes a catalyst, and as a catalyst we have specified inorganic acids, and preferably sulphuric acid. We now have made further discovery in the premises and have found that the acid salts, and preferably the acid sulphates—typically acid sodium sulphate, $NaHSO_4$—have value and utility, exceeding those of the acids themselves.

The catalytic effect is a function of the hydrogen ion, and accordingly the normal salts, in which the hydrogen is wholly replaced by a metal, have no value. The acid salts, however, in which the hydrogen ions are but partially replaced have value for the purpose in view. Scientifically stated, the solution must, in consequence of the presence of the acid salt, have a pH value less than 7. The acid salts are less effective than the acids themselves as catalysts, and for that reason the hydrolyzing operation requires a greater expenditure of time; but this disadvantage is more than offset by the gain, that they may be crystallized out of solution and used again. With the acids on the other hand, it is necessary, in order to remove them from solution, to neutralize the solution—that is to say, to precipitate the acid in the form of salt—by the addition of such a base as calcium; and the precipitated salt is lost, so far as further usefulness to the operation in hand is concerned. A further advantage of the acid salt over the acid itself is that it will not so readily react with the solvent.

Typically, we proceed as follows: We dissolve 100 parts by weight of lard in 400 parts of acetone; to this we add 15 parts of water and five parts of acid sodium sulphate (which serves as a catalyst). The material, so compounded, is placed in an autoclave and subjected to heat externally applied. The temperature of reaction may range between 150° and 160° C., effecting an internal vapor pressure of about 200 pounds. Reaction under such conditions continues for an hour and a half, with hydrolyzation of about 50% of the fat.

In this typical procedure, as will be understood, the fat (in this case lard) will have undergone the usual preliminary treatment with sulphuric acid.

In heating in an autoclave, when the temperature has risen to a sufficient degree, any air within the autoclave may advantageously be driven off through a tap, being replaced by acetone vapor.

It will be understood of the foregoing figures, that they are illustrative; and that the essential operation may be performed under modified conditions. For instance, operating at atmospheric pressure, temperature is necessarily limited to the boiling point of acetone (58°–60° C.); and in such case, hydrolysis may be effected, though at much slower rate. Alternatively, if temperature be increased, above the figure given (pressure being necessarily increased), the rate of hydrolysis will be accelerated.

Alternatively, an otherwise identical composition may be prepared, with the addition of three parts of the catalyst (acid sodium sulphate) instead of five; and in that case, the reaction will be prolonged to effect hydrolysis to the same degree.

In either case, when the initial step has been performed, the heating may be intermitted and the acetone may be separated from the other components. This separation is conveniently effected by distillation. The remaining products are removed to a settling tank, and there, in the absence of acetone, the water, carrying in solution the glycerol product of hydrolysis, will settle to the bottom, whence it is drawn off. There remains in the settling tank the fatty-acid product of hydrolysis and so much of the original fat as has not yet undergone hydrolysis.

If, instead of acetone, a solvent whose boiling point is higher than that of water be employed, the products of hydrolysis, after the driving-off of the solvent, will be practically devoid of water also. In order then to effect separation of glycerol, a limited quantity of water may be added, and, the glycerol being redissolved, the separation by decantation may be accomplished.

This remaining fatty-acid material is subjected to a similar second step. It is dissolved in acetone, in ratio, by weight, of 100 parts to 400; water is added—now in much greater quantity—in an amount as great as 100 parts; and again acid sodium sulphate is added, in quantity of five parts (alternatively, three parts) to serve as a catalyst. The same conditions of hydrolysis are renewed, and after 2½ hours a recovery will be found to have progressed to the hydrolyzation of more than 90% of the original fat. The quantity of water added in proceeding with such second step is conditioned by the percentage of fatty acid which has been produced in the first step. A greater amount than 100 parts is not forbidden, but 100 suffices.

As before, the acetone is driven off and the water, with glycerol in solution, is separated by decantation.

The alternative procedure indicated above, in which the smaller quantity of acid sulphate is added, though requiring more time for its performance, has the advantage of affording a fatty acid of lighter and accordingly more desirable color.

The separation, on the completion of the first hydrolysis step, of the water with glycerol in solution is advantageous, particularly where an economical recovery of glycerol is desired.

Alternatively, on the completion of the first step, without separation of the acetone solvent, and without decantation, addition may be made of the second, large quantity of water, and hydrolyzing conditions may then be renewed. After continued treatment for the period indicated above 2½ hours), the hydrolysis will be found to have progressed to a degree exceeding 90% of the original fat, and then the separations described may be effected.

From the separated water and glycerol the acid sodium sulphate may, by evaporation of the water, be crystallized, and being so crystallized out and recovered, is in condition for re-use in new batches of material.

Other acid salts, having when in aqueous solution pH values less than 7, are available and may be used with success. For example, soluble dihydrogen ortho-phosphates or other soluble hydrogen sulphates.

In the foregoing description the solvent employed is acetone. The essential characteristic of acetone is that, being a solvent of grease, it is also miscible with water; and for our purposes any other water-miscible solvent of grease will serve. In this category are found methyl ethyl ketone, diethyl ketone, that mixture of acetone (85%) and isopropanol (15%) known by the trade-name Solvatone, ethylene glycol monethyl ether (commonly called Cellosolve), ethylene glycol monobutyl ether (commonly called Butyl Cellosolve), and dioxan.

In the ensuing claims, we use the term "fat," and the term as here used will be understood to be inclusive of greases.

We claim as our invention:

1. The method of hydrolyzing fat for the production of fatty acid and glycerol which consists in dissolving the fat in a water-miscible solvent of a group that consists of acetone, methyl ethyl ketone, diethyl ketone, that mixture of acetone (85%) and isopropanol (15%) known by the trade-name Solvatone, ethylene glycol monoethyl ether (commonly called Cellosolve), ethylene glycol monobutyl ether (commonly called Butyl Cellosolve), and dioxan; adding water and, as a catalyst, a water-soluble salt of a group that consists of the acid sulphates and dihydrogen orthophosphates; subjecting the solution to hydrolyzing temperature; distilling off the solvent; and separating the glycerol in aqueous solution, from the residue.

2. The method of hydrolyzing fat for the production of fatty acid and glycerol which consists in dissolving the fat in acetone; adding water and, as a catalyst, acid sodium sulphate; subjecting the solution to hydrolyzing temperature; distilling off the acetone; and then by decantation separating the water, with the glycerol product of hydrolysis in solution, from the fatty-acid residue.

JAY R. MOORE.
EARL K. WALLACE.